(12) United States Patent
Bieber et al.

(10) Patent No.: US 6,454,295 B2
(45) Date of Patent: Sep. 24, 2002

(54) COVERING CAP FOR A GAS BAG MODULE

(75) Inventors: Udo Bieber, Niedernberg; Achim Hehl, Hösbach, both of (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/772,837

(22) Filed: Jan. 30, 2001

(30) Foreign Application Priority Data

Feb. 24, 2000 (DE) .................................. 200 03 365 U (51) Int. Cl.$^7$ ................................................ B60R 21/20
(52) U.S. Cl. .................................................... 280/728.3
(58) Field of Search ........................ 280/728.3, 731, 280/732

(56) References Cited

U.S. PATENT DOCUMENTS

| | | | |
|---|---|---|---|
| 4,310,174 A | * 1/1982 | Sundeen et al. | 280/731 |
| 5,023,418 A | 6/1991 | Beckhausen | |
| 5,372,379 A | * 12/1994 | Parker | 280/728.3 |
| 5,390,950 A | 2/1995 | Barnes et al. | |
| 5,797,619 A | * 8/1998 | Bauer et al. | 280/728.3 |
| 5,804,121 A | 9/1998 | Gallagher | |
| 5,902,428 A | 5/1999 | Gallagher et al. | |
| 5,957,483 A | * 9/1999 | Miltenberger et al. | 280/728.3 |
| 5,961,869 A | * 10/1999 | Irgens | 219/549 |

FOREIGN PATENT DOCUMENTS

| | | |
|---|---|---|
| DE | 19907742 | 8/2000 |
| EP | 0681944 | 11/1995 |
| EP | 0765781 | 4/1997 |
| EP | 0666956 | 7/1997 |
| JP | 10076544 | 3/1998 |

* cited by examiner

Primary Examiner—Paul N. Dickson
Assistant Examiner—Faye M. Fleming
(74) Attorney, Agent, or Firm—Tarolli, Sundheim, Covell, Tummino & Szabo L.L.P.

(57) ABSTRACT

The invention relates to a covering cap for a gas bag module of a vehicle occupant restraint device. The covering cap comprises at least one plastic layer and is provided at least in places with a heating means.

4 Claims, 7 Drawing Sheets

COVERING CAP FOR A GAS BAG MODULE

TECHNICAL FIELD

The invention relates to a covering cap for a gas bag module of a vehicle occupant restraint device.

BACKGROUND OF THE INVENTION

Such covering caps are intended to protect the gas bag lying underneath from being damaged before it is used, but at the same time are intended to match the appearance of the interior of the vehicle in an optimum manner. Therefore the covering cap is often matched in material and structure for example to the design of the instrument panel. On activation of a gas bag of a vehicle occupant restraint system, the covering cap, which is integrated for example in the steering wheel or in the instrument panel, must be opened in order to free the gas bag. Often for this purpose predetermined breaking points are prefabricated in the covering caps, at which the covering cap can open.

In the case of covering caps consisting of plastic, there is a problem in that the forces necessary for opening the covering cap vary with the temperature, because the material characteristics of the plastics which are used are highly dependent on temperature. Thus, for example, the brittleness of the plastic increases greatly as the temperature falls, whereas the strength of the plastic decreases with a rising temperature. This leads to the covering cap, which is designed for an optimum opening in summertime temperatures not being able to be reliably opened at low temperatures in winter. In addition, in the case of low temperatures, already small external forces can lead to a damage to the covering cap.

BRIEF SUMMARY OF THE INVENTION

The invention provides a covering cap for a vehicle occupant restraint system which fulfills its function reliably over a wide temperature range. This is achieved in a covering cap which comprises at least one plastic layer and is provided at least in places with a heating means, in particular an electric heating arrangement. Since therefore at lower temperatures the temperature of the covering cap can be increased with respect to the ambient temperature, the material characteristics of the plastic of the covering cap are kept constant over a wide range of the ambient temperature, and the force necessary for opening the covering cap remains approximately constant. As the covering cap is therefore always kept at a defined temperature, the notch sensitivity, which increases with a falling temperature, also does not increase with low ambient temperatures.

In an advantageous further development of the invention, the covering cap has a weakened zone and the heating means is arranged in the region of the weakened zone. A weakened zone, for example a tear line or a zone having reduced thickness in the covering gap, is arranged at the site at which the covering cap is to open in order to free the gas bag. This is the actually critical zone of the covering cap, because it must be ensured that at this site the covering cap opens on application of a defined force. Hence it is therefore sufficient to arrange the heating means only in the region of this weakened zone, e.g. directly at the weakened zone or in sections of the covering cap lying immediately adjacent thereto. In this way, the production becomes less costly and less intensive with respect to material.

Advantageously, the heating means is a heating wire. As the weakened zone generally does not have a large width, the use of a favorably priced heating wire is sufficient to heat this area.

Preferably the heating means consists of an electrically conductive plastic. An electrically conductive plastic can be easily included in the desired arrangement and layer thickness during the manufacturing process of the covering cap consisting of plastic. Also, the danger does not exist either that the layer presses through the material and impairs the visual appearance.

Advantageously, a layer of electrically conductive plastic is embedded during the manufacturing process of the covering cap. In this way, the heating means can be produced in one manufacturing step with the covering cap.

The electrical connecting elements for connection of the heating means to a current source are preferably embedded in a plastic layer of the covering by casting, in order to keep the production costs low.

In another advantageous embodiment of the invention, the heating means is a heating mat. This is particularly advantageous owing to the flat extent of a heating mat when the entire covering cap is to be heated.

For simple and close fastening of the heating mat to the covering, the heating mat is preferably connected to a plastic layer of the covering by ultrasonic welding.

In an advantageous embodiment, a leather coating is provided, and the heating means is arranged between the plastic layer of the covering and the leather coating. In this way, a leather-covered covering cap can be heated in a simple manner.

BRIEF DESCRIPTION OF THE DRAWINGS

FIGS. 5a and 5b show a diagrammatic view of the inner face of a covering cap according to the invention, having a conductive plastic layer, in accordance with a further embodiment, FIG. 5b showing a slight modification compared with the embodiment according to FIG. 5a;

DETAILED DESCRIPTION OF THE PREFERRED EMBODIMENTS

Figure 1:
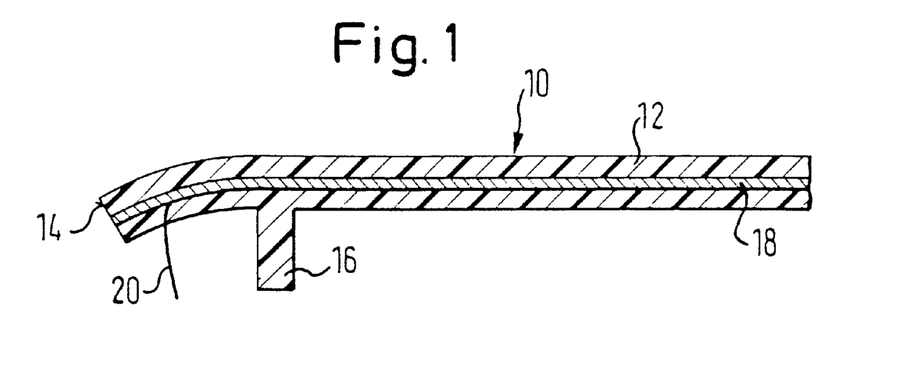
FIG. 1 shows a diagrammatic sectional view of a covering cap according to the invention in accordance with a first embodiment.

In FIG. 1 a first embodiment of a covering cap 10 according to the invention is shown for a gas bag module of a vehicle occupant restraint device, only a portion of the covering cap being illustrated. The covering cap 10 preferably has a plastic layer 12 which can for example be angled at its edges 14, in order to be better integrated into the visual appearance of the steering wheel or the instrument panel. The covering cap may, however, also consist of two or more layers. In addition, fastening elements 16 are provided, which can be part of the plastic layer 12, with which the covering cap 10 can be fastened to the vehicle. Inside the covering cap 10, a heating means 18 runs which is surrounded by the plastic material of the covering cap 10. The heating means 18 is preferably an electric heating arrangement, the electrical supply taking place via a connection 20. The heating means 18, as indicated in FIG. 1, can extend through the entire covering cap 10 or across substantial parts thereof. In case the covering cap consists of several superimposed layers, then the heating means normally is arranged in one of these layers or also between two of them.

In this embodiment, with low ambient temperatures the entire covering cap 10 is heated and kept at a predetermined temperature which may lie for example at approximately 20° C.

The heating means 18 can consist for example of a heating wire 40, laid in an areal manner (FIG. 6*a*), of a heating mat 42 (FIGS. 6*b*, 7 and 8), i.e. an areal arrangement of one or more heating wires, or of an electrically conductive layer 44 (FIGS. 1, 5*a*), for example a layer of a known electrically conductive thermoplastic plastic.

In the first two mentioned cases, the heating means 18 can be applied during the manufacturing process of the covering cap 10 onto a first constructed plastic layer of the covering cap 10 and then integrally cast with the remaining layer or layers of the covering cap 10, or the heating wire can be embedded by injection-molding. In the case of the use of an electrically conductive plastic layer, the material can be inserted without interruption of the injection molding process in a further molding step.

Through the heating means 18, the plastic of the covering cap 10 can be heated and thus an embrittlement of the plastic at low temperatures can be counteracted. In this way, the notch sensitivity of the surface of the covering cap 10 is also reduced. The behavior of the covering cap can be kept almost constant over a wide range of the ambient temperature.

In the covering cap 10 in addition weakened zones 22, i.e. zones in which the cap has a reduced thickness, can be provided, which facilitate the opening of the covering cap to free the gas bag. Examples of the arrangement of weakened zones are illustrated in FIGS. 2, 3, 5*a* and 7.

Figure 2:
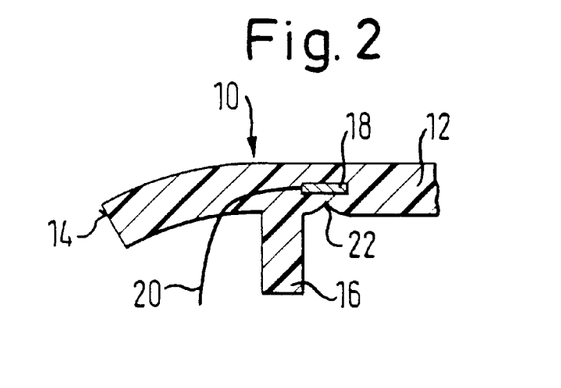
FIG. 2 shows a diagrammatic sectional view of a covering cap according to the invention in accordance with a second embodiment.

FIG. 2 shows a further possibility for the conversion of the invention. In this embodiment, the covering cap 10 is provided with weakened zones 22 in which the covering cap 10 tears open on application of a predetermined force, in order to free a gas bag. The weakened zones are illustrated here as indentations, but may also be formed in a different manner, e.g. by notches without material removal or by a reduction of the thickness of the covering cap over a large area. The weakened zones 22 may be arranged for example at the edge of the covering cap in the vicinity of the fastening of the covering cap to the vehicle, as is illustrated in FIG. 2.

In this embodiment the heating means 18 is only arranged in the region of the weakened zone 22. As heating means 18 preferably a heating wire or an electrically conductive layer is used. An electrically conductive layer can, depending on the material which is used, also contribute to the weakening, it then being advantageous if the electrically conductive layer is arranged directly over the mechanical weakened zone, as is shown in FIG. 2.

Figure 3:
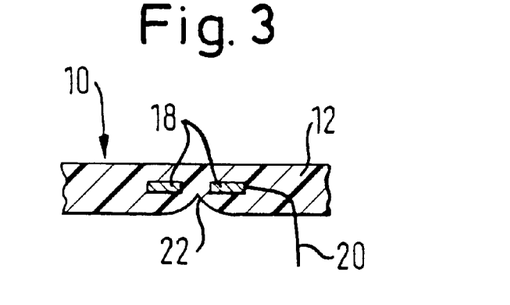
FIG. 3 shows a diagrammatic sectional view of a covering cap according to the invention in accordance with a further embodiment.

In FIG. 3 a further embodiment of the invention is shown, in which the weakened zone 22 is arranged in the center of the covering cap 10, in order to make possible a central opening of the covering cap on unfolding of the gas bag. In this case, two heating means 18 are arranged to the right and left of the weakened zone 22, for example two heating wires, two heating mats or two electrically conductive layers. In this way, the opening behavior of the covering cap is not influenced by the material characteristics of the heating means which is used.

Figure 4:
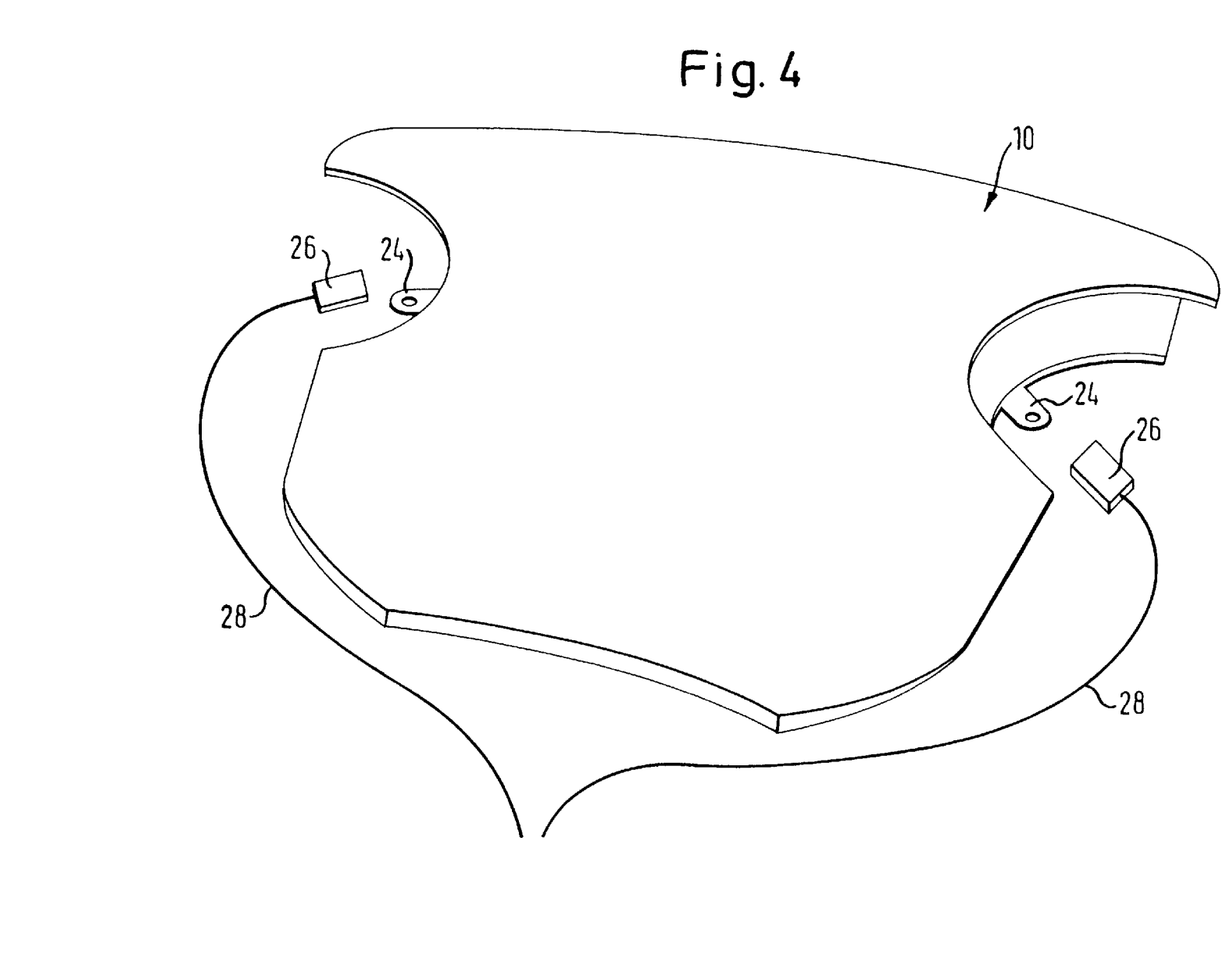
FIG. 4 shows a diagrammatic three-dimensional view of a covering cap according to the invention.

FIG. 4 shows a possibility for realizing the electrical connection of the heating means 18 with a current supply (not shown). The connections 20 consist in this case of flat-nose plugs 24 worked into the covering cap 10, onto which sleeves 26 are placed, which in turn are connected via cables 28 with a current supply.

Figure 5A:
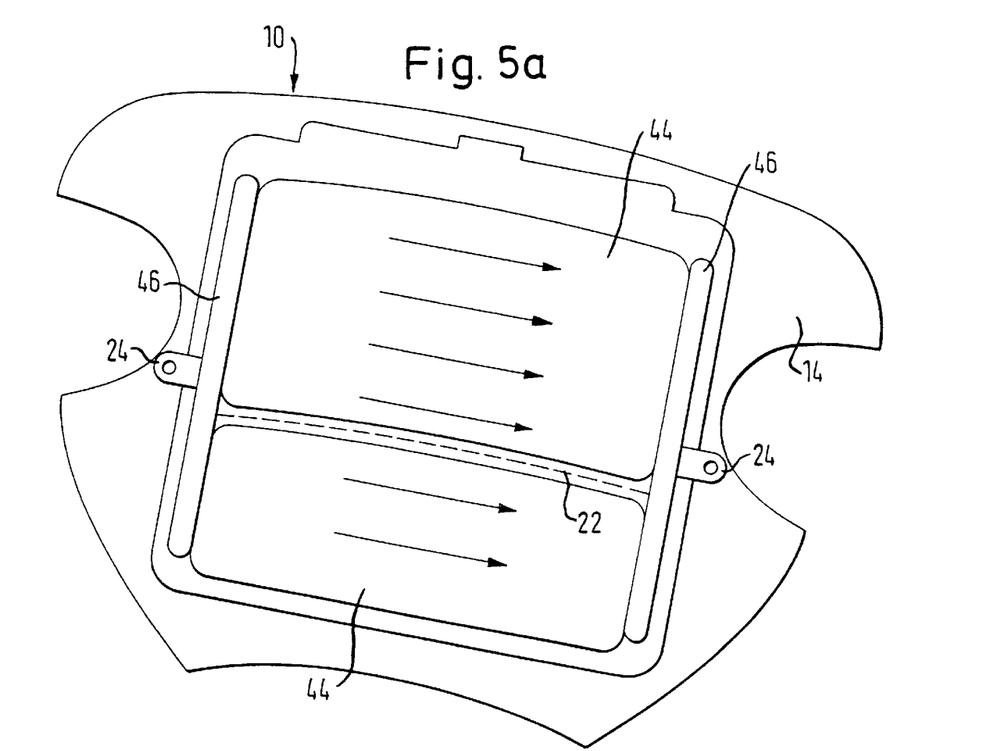
Figure 6A:
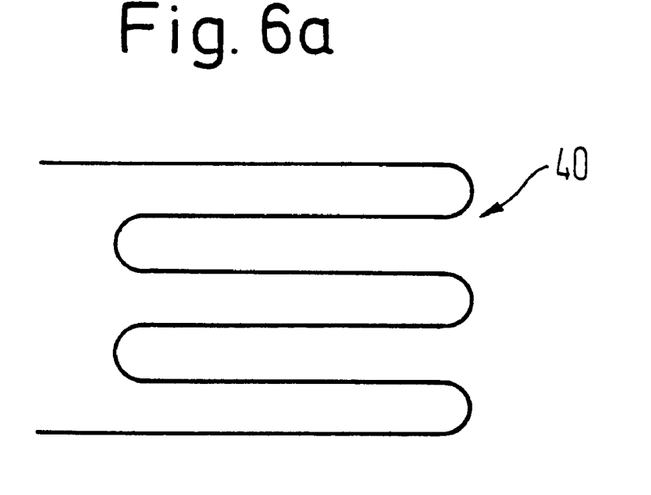
FIGS. 6a and 6b show various heating means which are able to be used in the covering cap according to the invention.
Figure 6B:
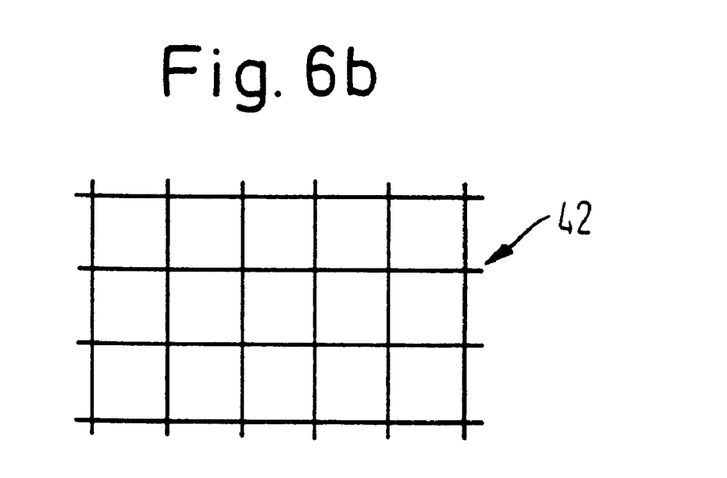

In the embodiment shown in FIG. 5*a*, an electrically conductive plastic layer 44 is embedded in the inner face of the covering cap 10 by casting. For the electrical contacting, elongated contact strips 46 of metal are provided, which are preferably connected in one piece with flat-nose plugs 24. The connection with a current source takes place as described in connection with FIG. 4. The length of the contact strips 46 corresponds approximately to the extent of the electrically conductive layer 44, in order to ensure a uniform flow of current through the layer 44. The flow of current is made clear in FIG. 5*a* by arrows.

The contact strips 46 may also be arranged at the angled edges 14, as long as they are in electrical contact with the layer 44.

The contact strips 46 are preferably designed such that they can be placed into the injection mold during the injection molding process and can be connected with the covering cap 10 by injection molding. Alternatively, the covering cap can be shaped such that it has a recess, for example, into which the contact strips can be placed or bonded in a form-fitting manner.

In the region of the weakened zone 22 (illustrated in FIG. 5*a* by a dashed line), the layer 44 may have an interruption, may be constructed so as to be continuous or may also be adapted in its form to the weakened zone.

Figure 5B:
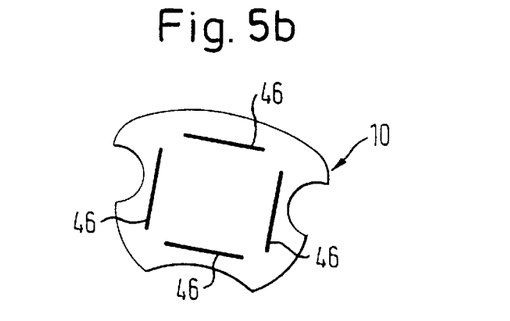

FIG. 5*b* shows alternative possibilities for the arrangement of a total of four contact strips 46.

Figure 7:
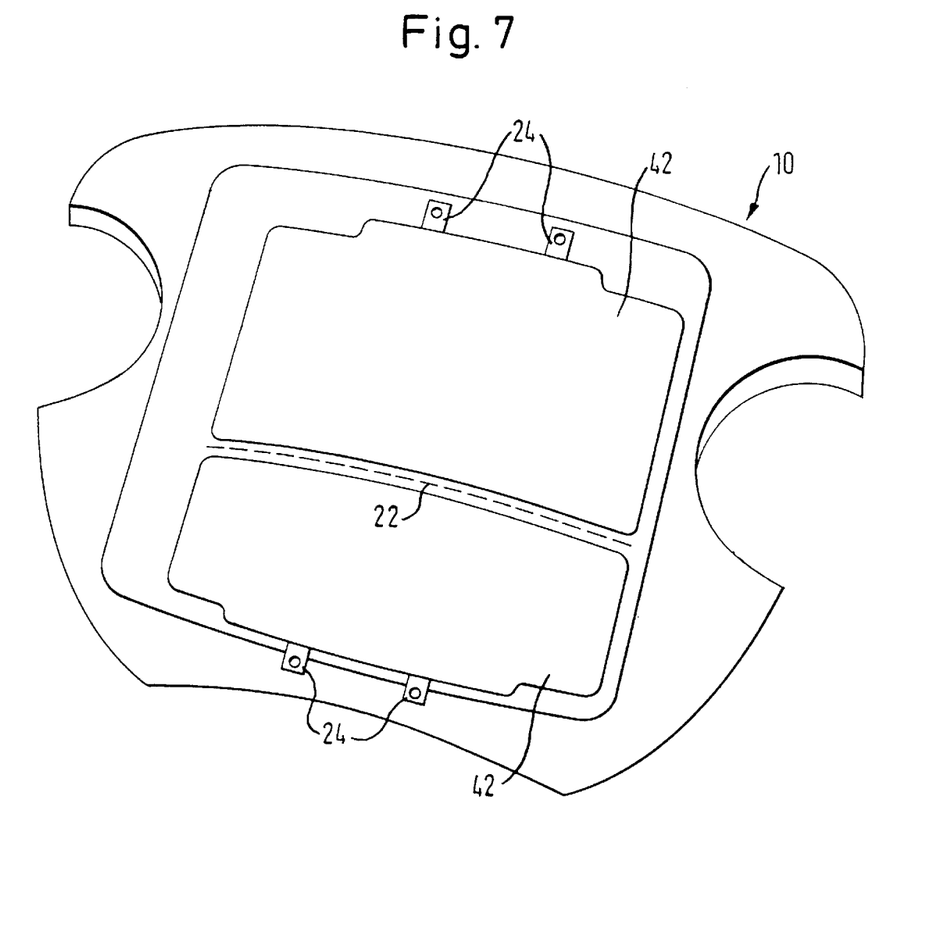
FIG. 7 shows a diagrammatic view of the inner face of a covering cap according to the invention and comprising a heating mat, in accordance with a further embodiment.

FIG. 7 shows an embodiment of a covering cap 10 according to the invention, with two heating mats 42 arranged on the inner face of the covering cap. The heating mats 42 leave a weakened zone 22 free, so as not to impair the opening of the covering cap. For each heating mat 42, two electrical connections are provided via flat-nose plugs 24, which are connected with a current source as described.

Figure 8:
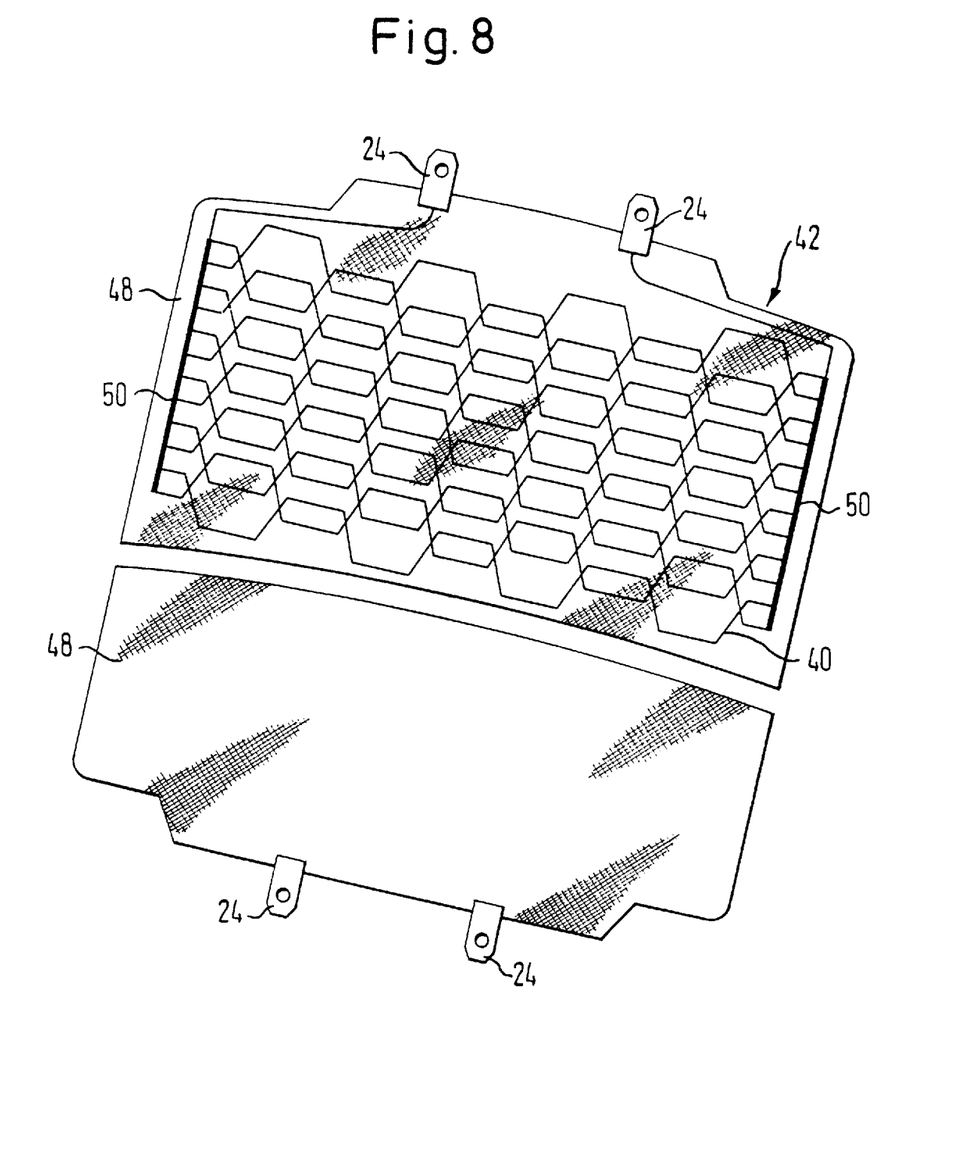
FIG. 8 shows a view of a heating mat able to be used in the covering cap according to the invention.

The structure of the heating mats is shown more precisely in FIG. 8. The heating mats 42 consist of a fabric 48, onto which heating wires 40 are applied. Of the lower heating mat, only the fabric 48 is illustrated; corresponding heating wires 40 are in fact present, but are not shown. These heating wires 40 are connected via electric terminal boards 50 with flat-nose plugs 24. The heating mat 42 can be fastened to the plastic layer 12 of the covering cap 10 for example by ultrasonic welding.

Figure 9:
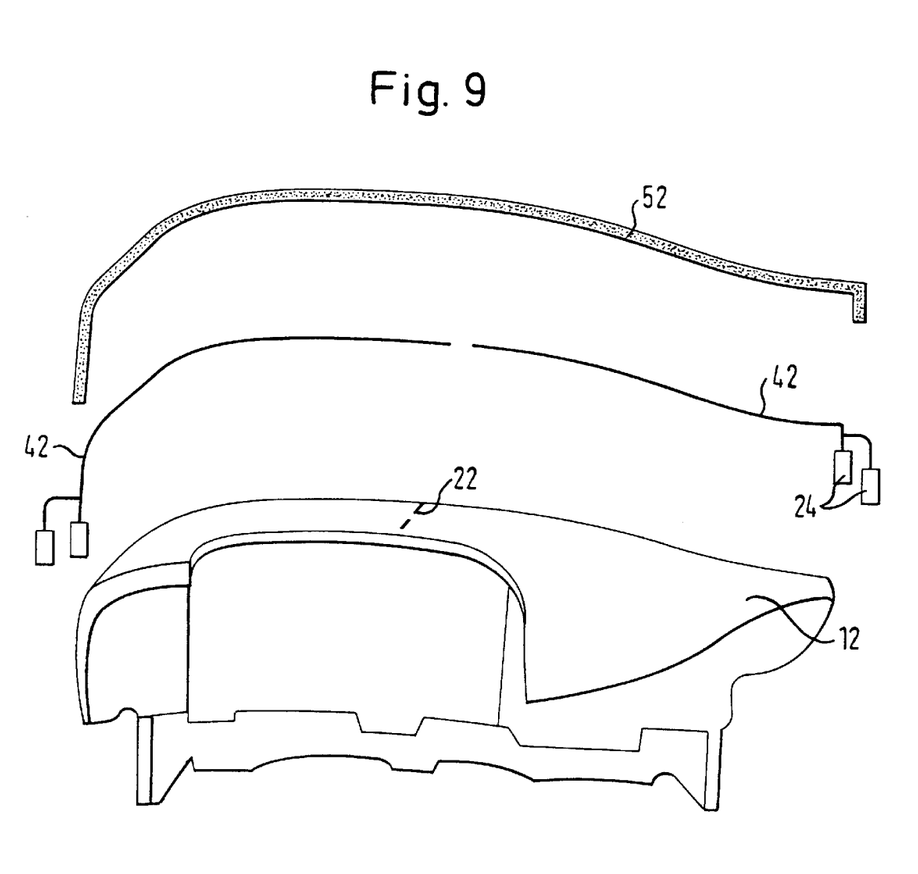
FIG. 9 shows a diagrammatic exploded view of a covering cap according to the invention, with a leather coating in accordance with a further embodiment.

A further embodiment is shown in FIG. 9. This embodiment is preferred, in order to provide a leather-covered covering cap with a heating means 18. The plastic layer forming the body of the covering cap is connected on its exterior with two heating mats 42, which leave free a weakened zone 22. A leather covering 52 is applied over the assembly of plastic layer 12 and heating mats 42.

The invention is not limited to the illustrated embodiments, e.g. features of the illustrated embodiments can be combined with each other at the discretion of the specialist in the art.

In addition, for temperature regulation, an electronic arrangement can be provided with a temperature sensor arranged in the vicinity of the heating means, which are not illustrated here. The current supply of the heating means 18 can be connected to the supply of the other electrical consumers in the steering wheel or may also be realized as an independent electrical arrangement, for the use of the covering cap in a driver's gas bag.

What is claimed is:

1. A method of manufacturing a covering cap for a gas bag module of a vehicle occupant restraint device, said method comprising the steps of:

injection molding a first plastic layer, injection molding a second layer, said second layer consisting of an electrically conductive plastic which is a heating means, injection molding a third plastic layer, and embedding said second layer between said first layer and said third layer of said covering cap.

2. A method of manufacturing a covering cap for a gas bag module of a vehicle occupant restraint device, said method comprising the steps of:

injection molding at least one plastic layer, and connecting a heating means to said at least one plastic layer by ultrasonic welding, said heating means consisting of a heating mat comprising a fabric onto which heating wires are applied.

3. A covering cap for a gas bag module of a vehicle occupant restraint device, said covering cap comprising at least one plastic layer and being provided at least in places with a heating means, said heating means being a heating mat consisting of a fabric onto which heating wires are applied, and electrical connecting elements for connecting a current source to said heating means, said elements being embedded in said at least one plastic layer of said covering cap by injection molding.

4. A covering cap for a gas bag module of a vehicle occupant restraint device, said covering cap comprising at least one plastic layer and being provided at least in places with a heating means, said heating means being-a heating mat consisting of a fabric onto which heating wires are applied, and a leather coating, said heating means being arranged between one of said at least one plastic layer of said covering cap and said leather coating.

* * * * *